(12) United States Patent
Yang et al.

(10) Patent No.: US 11,817,800 B2
(45) Date of Patent: Nov. 14, 2023

(54) IMPACT ENERGY HARVESTERS FOR SELF-POWERED WRIST-WORN WEARABLES

(71) Applicant: CITY UNIVERSITY OF HONG KONG, Kowloon (HK)

(72) Inventors: Zhengbao Yang, Kowloon (HK); Biao Wang, Kowloon (HK)

(73) Assignee: CITY UNIVERSITY OF HONG KONG, Kowloon (HK)

(*) Notice: Subject to any disclaimer, the term of this patent is extended or adjusted under 35 U.S.C. 154(b) by 112 days.

(21) Appl. No.: 17/496,874

(22) Filed: Oct. 8, 2021

(65) Prior Publication Data

US 2023/0110802 A1 Apr. 13, 2023

(51) Int. Cl.
*H02N 2/18* (2006.01)
*H02N 2/00* (2006.01)
*A45F 5/00* (2006.01)

(52) U.S. Cl.
CPC ............. *H02N 2/186* (2013.01); *A45F 5/00* (2013.01); *H02N 2/0055* (2013.01); *H02N 2/0075* (2013.01); *A45F 2005/008* (2013.01)

(58) Field of Classification Search
CPC .... H02N 2/186; H02N 2/0055; H02N 2/0075; A45F 5/00; A45F 2005/008
See application file for complete search history.

(56) References Cited

U.S. PATENT DOCUMENTS

| | | | |
|---|---|---|---|
| 8,180,591 B2 * | 5/2012 | Yuen ................. | G08B 21/0453 702/160 |
| 10,076,252 B2 * | 9/2018 | Saponas .............. | A61B 5/6824 |
| 10,103,648 B2 * | 10/2018 | Park ...................... | G04G 19/00 |
| 10,234,934 B2 * | 3/2019 | Connor ................. | G06F 3/017 |
| 10,250,163 B2 * | 4/2019 | Loi ......................... | H02N 1/08 |
| 10,595,754 B2 * | 3/2020 | Pushpala .............. | A61B 5/6834 |
| 10,610,111 B1 * | 4/2020 | Tran ....................... | A61B 5/411 |
| 11,476,780 B2 * | 10/2022 | Yang ..................... | G04C 10/00 |
| 2019/0115524 A1 * | 4/2019 | Bevilacqua ......... | H10N 30/8554 |

* cited by examiner

*Primary Examiner* — Emily P Pham

(57) ABSTRACT

A wearable device that is capable of harvesting kinetic energy from wrist motions using piezoelectric and/or electromagnetic energy harvesters is disclosed. A first part of the device is worn on the user and second part of the device is movable against the second part to accentuate the frequency of movements.

5 Claims, 10 Drawing Sheets

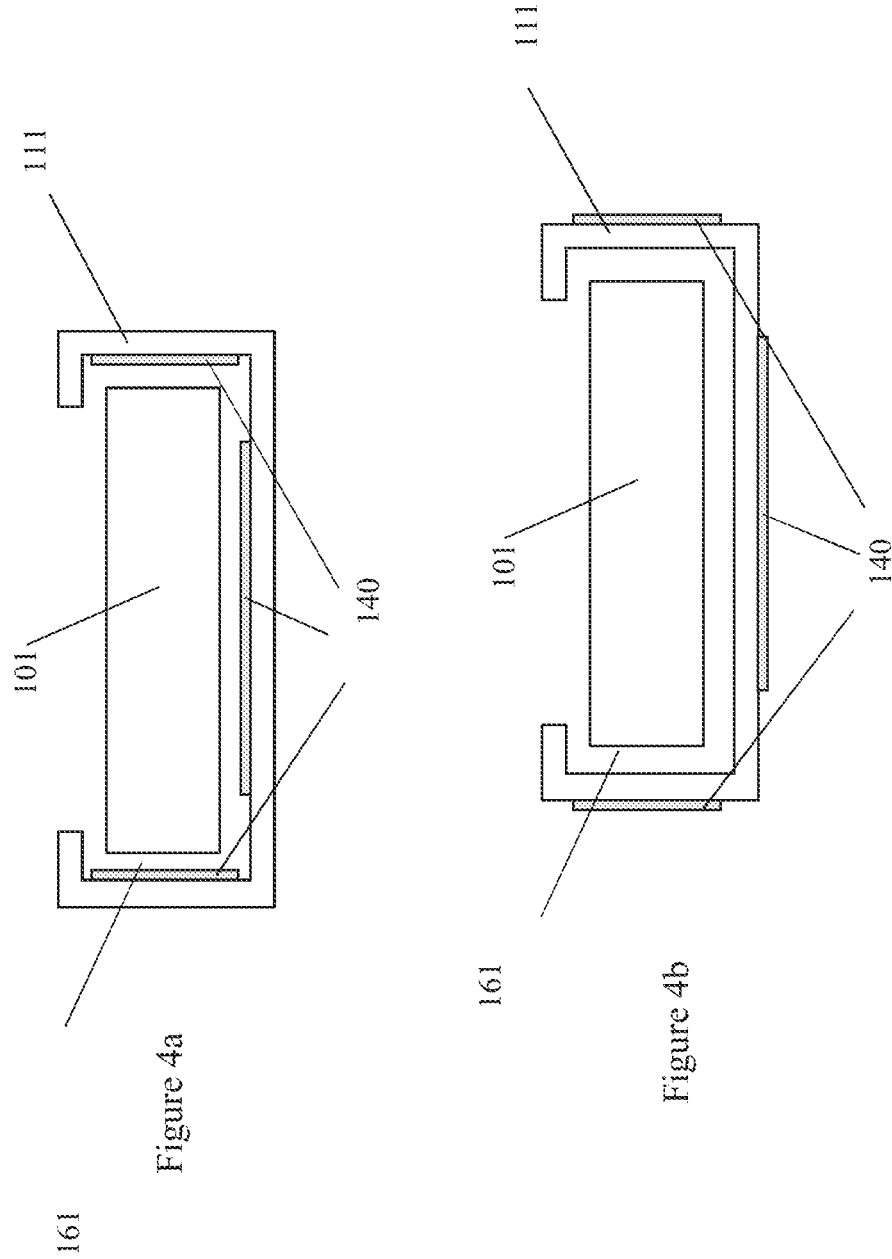

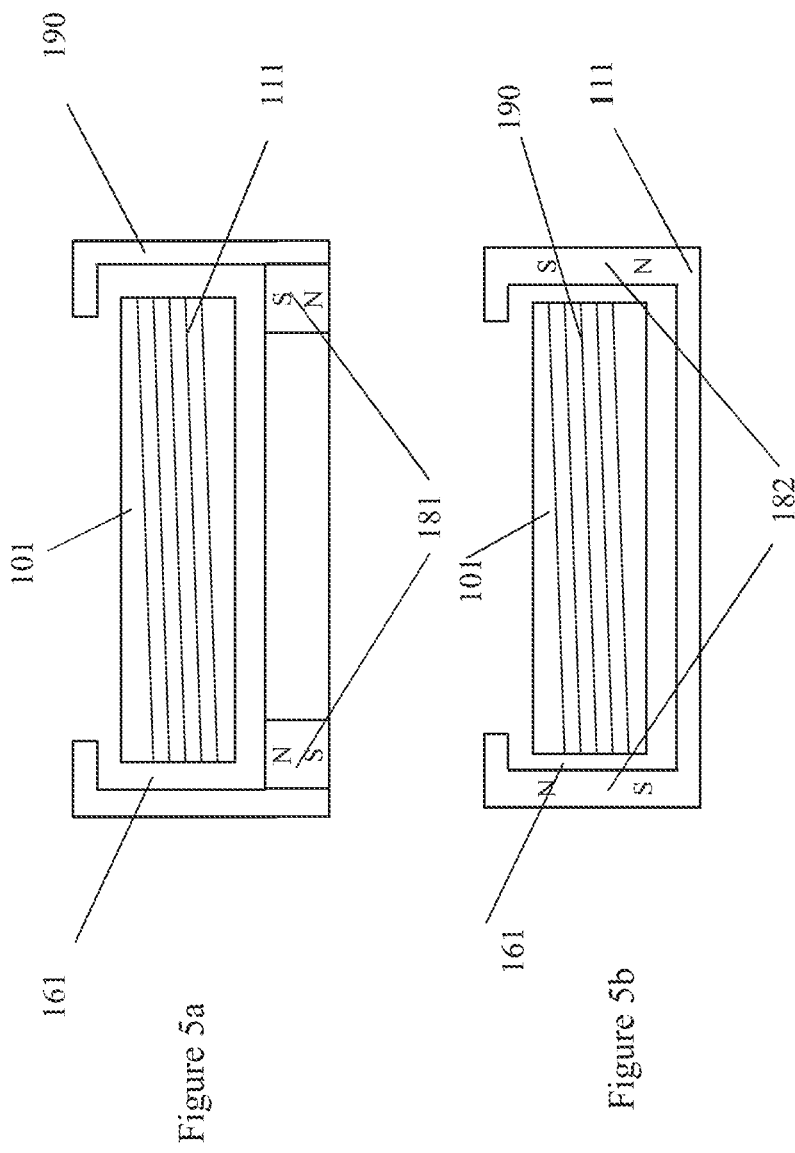

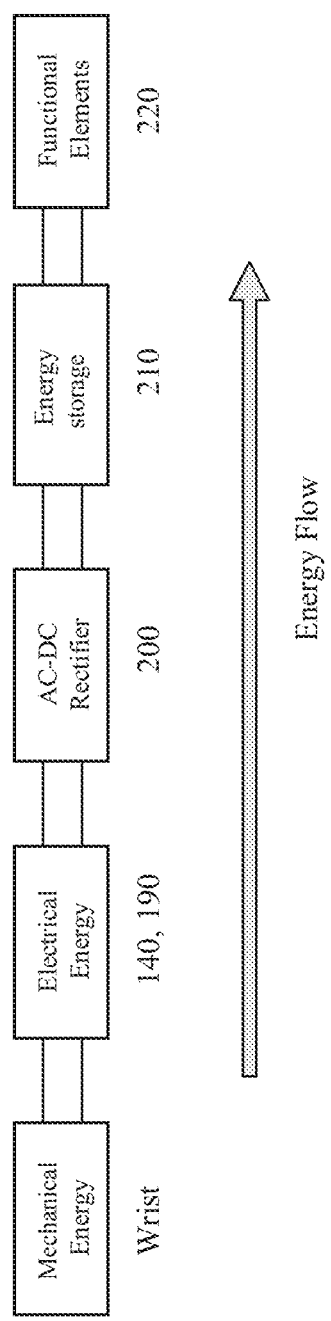

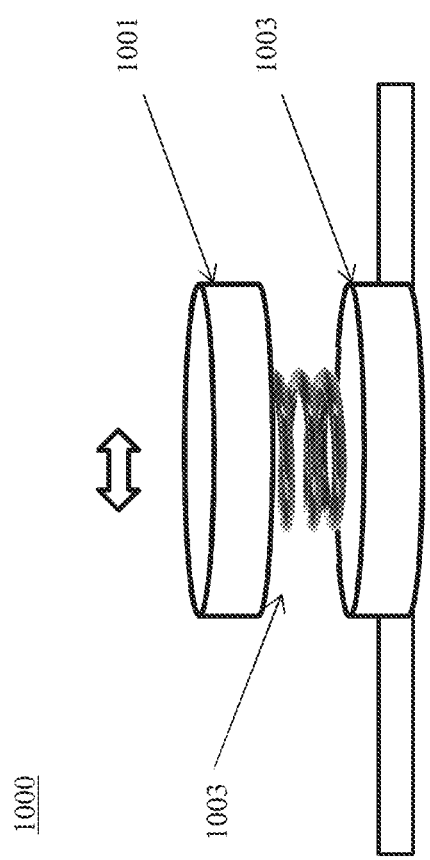

IMPACT ENERGY HARVESTERS FOR SELF-POWERED WRIST-WORN WEARABLES

TECHNICAL FIELD

The invention relates to the field of wearable devices. In particular, the invention relates to wearable devices that are capable of generating power from movements of the wearer.

BACKGROUND

Wrist-worn smart electronic devices such as smartwatches and wristbands, as Internet of Things, are becoming increasingly popular due to their multi-functionality and their usefulness in monitoring the health and security of the wearers of the devices. However, these wearable devices are generally powered by electrochemical batteries that have limited power storage capacity. These electrochemical batteries pose severe environmental problems that may affect human and animal health. For example, if a battery is left in a forgotten device for too long, there is often a possibility of battery acid leaks, which could corrode the internal electrical circuits in the device.

Also, it is troublesome to have to frequently change batteries, which is often followed by the need to re-set or re-initialise the devices, such as entering the current date into the memory of a microprocessor in the device, and so on.

It has been proposed to develop self-powered, smart, wrist-wearable devices which could harvest energy from movements of the user's hand on which these devices are worn. Unfortunately, it is not easy to extract energy from hand movements, or any user movements, as most user movements have low frequency and large amplitude. For example, the hand is not a jittery member of the body, moving un-endingly all through the day. However, it is often in the change of speed or in the change of movement direction of the hand that produce forces which may be converted into electrical energy in these devices. Typically, a movement-based electricity generator is provided in these devices. The movement-based electricity generator produces electrical energy from the forces applied by user movements. The produced electricity is typically stored in a battery inside the devices while, at the same time, stored energy inside the battery is used to operate the devices.

However, the distances over which the hand of a normal person move as he goes about his daily affairs are often too large, and this means that it takes too long a time before the hand changes or reverse directions.

Thus, for most handworn smart devices which require a typical supply of energy, the changes in hand direction over the course of a day is generally not frequent enough to be used as a sufficient source of forces to movement-based electricity generators to generate energy.

Accordingly, it is desirable to proposed improvements over the existing technologies, to provide an improved possibility of harvesting sufficient energy to supply power to wearable devices. Furthermore, it is desirable to improve the harvest efficiency or yield of energy from low frequency and large amplitude movements of the hand or other parts of the body.

SUMMARY OF THE INVENTION

In a first aspect, the invention proposes a device capable of being carried on a part of the body of a person, the device comprising a first part configured to be secured to the body of the user; a second part that is integral to the first part; the second part being resiliently movable relatively to the first part; at least one motion based electricity generator arrange to interact with movements of the second part in order to generate electricity from the movements of the second part.

In other words, by a resilient structure or a resilient material that is used to make up or produced the second part, or used to connect the second part to the first part, the invention provides the possibility that the second part is capable of wobbling against the first part, especially when the first part has moved and comes to a halt, or has changed movement direction. In other words, the second part is arranged and movably affixed to the first part in such a way that movements of the second part is under-damped in response to the movements of the first part.

The freedom of movements of the second part relative to the first part provides the possibility that the second part can continue to move on in one direction even when the first part has stopped moving in that one direction. Eventually, the second part moving on in that direction is held back and propelled by the first part into moving in a reversed direction. When the second part has reached the movement limit in the reversed direction, the second part is sprung or propelled back again into the original direction. In this way, the second part goes back and forth relative to the first part multiple times after the first part has changed in movement direction, creating a wobble. The more the second part wobbles, the more a movement-based generator in the second part can be used to generate electricity.

Preferably, the second part has a weight that is greater than that of the first part. The greater the weight of the second part, the more energy is in the second part to be dissipated by the second part wobbling or moving back and forth relative to the first part. This increases the amount of movements that a motion based electricity generator installed onto the second part may experience, to create electricity using the motion based electricity generator.

Optionally, the motion based electricity generator is an electromagnetic transducer; the electromagnetic transducer having a magnet and an inductive coil capable of being moved relative on to the other when caused by the movements of the second part. Alternatively, the motion based electricity generator comprises one or more piezoelectric elements. As the skilled reader would understand, both electromagnetic transducer and a piezoelectric element are different types of motion-based electricity generators.

The advantage of using piezoelectric elements over an electromagnetic transducer is that piezoelectric elements can be smaller and are easier to install out of sight in many devices. This allows the final product to look the same as other products that do not have the same technology, such as a normal watch without energy harvesting capabilities from use movements.

Preferably, the piezoelectric element is affixed to the second part to move along with the second part. Alternatively, the piezoelectric element is affixed to the first part such that the second part is capable of moving to hit or impact against the piezoelectric element.

Typically, when the first part and the second part are moving in one trajectory, the second part is capable of continuing to move the trajectory when the first part reverses on the trajectory, until the movement of the second part is stopped or withheld by the connection of the second part to the first part, at which point in time this causes the second part to reverse in direction to follow the trajectory of the first part, only to be held back again by the first part when the second part overruns the first part, in which case the second part reverses in trajectory again. Multiple repetitions of such movements of the second part creates a wobble of the second part relative to the first part.

In some embodiments, the first part is a belt for being worn around a body part; the embodiments comprising a housing secured to the belt; the second part being a movable piezoelectric element in the housing. Alternatively, the first part is a belt for encircling the body part; the second part is a belt for encircling the body part; the second part having a larger diameter than the diameter of first part; such that the first part encircles the body part tighter than the second body part, to provide that the second part is capable of being movable relatively to the first part.

Typically, the body part that may be adorned with embodiments of the invention is the wrist of the user. Other body parts such as the ankle, biceps, neck, waist or the torso can be alternative body parts used instead of the wrist.

Preferably, the second part is a time telling device; the first part being a housing containing the time telling device; the time telling device being movable relatively to the first part by being movable inside the housing; and the piezoelectric element being affixed to the first part in that the piezoelectric element is affixed to the housing.

Therefore, the invention provide a possibility of improving energy harvesting by providing the possibility of increased frequency and likelihood of mechanical impacts or acceleration.

BRIEF DESCRIPTION OF THE DRAWINGS

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

FIGS. 4a-4b show the layouts of the piezoelectric elements on the cases;

FIGS. 5a-5b show the layouts of the electromagnetic transducer on the cases;

FIG. 6 shows the energy flow of the embodiment;

FIG. 10 shows yet another embodiment of the invention.

DETAILED DESCRIPTION OF PREFERRED EMBODIMENTS

Figure 1:
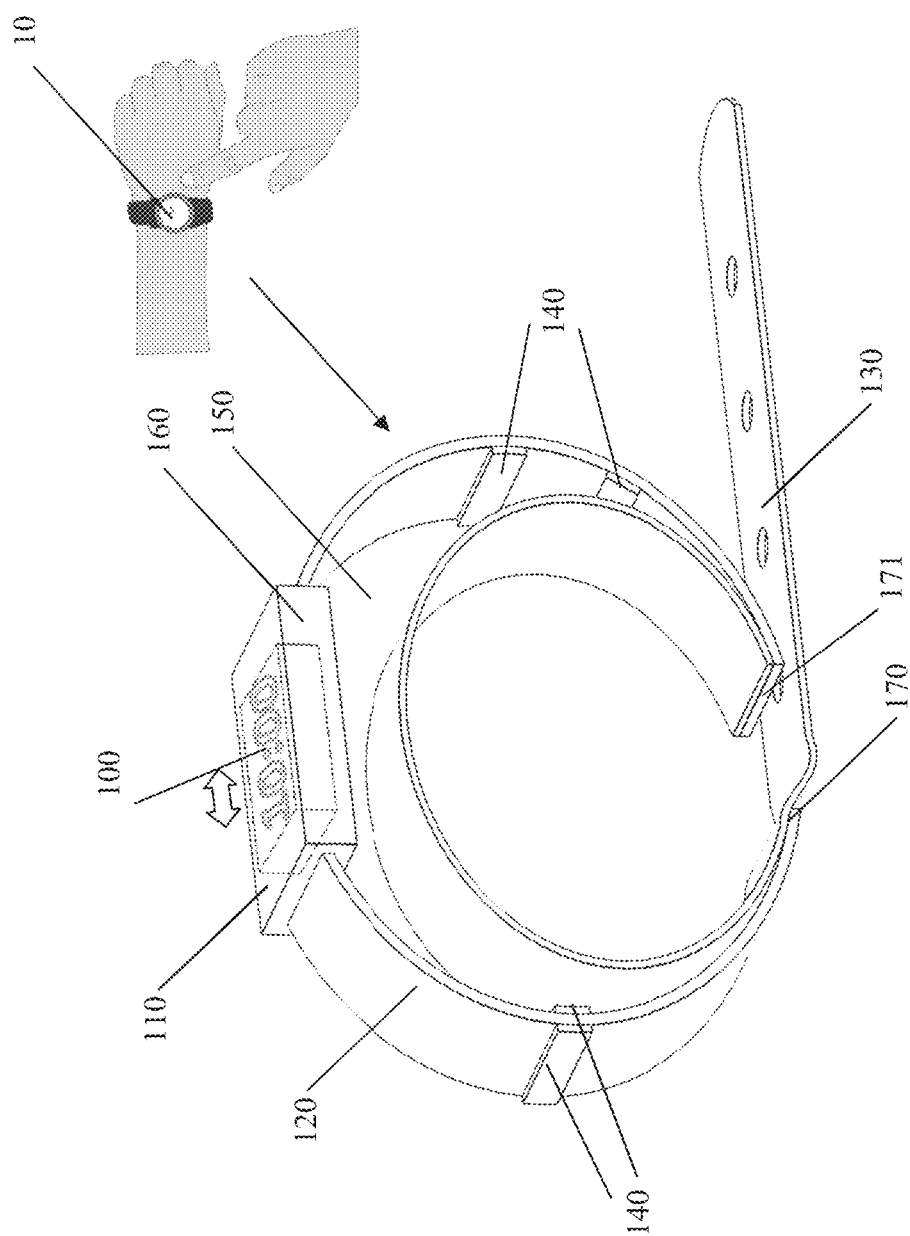
FIG. 1 is an isometric view of the two band impact energy harvester with a moveable case for self-powered wrist-worn wearables.

FIG. 1 is an isometric view of a device 10 that is configured to be worn on the wrist of a person. The device 10 comprises electronic components that need to be supplied with electricity in order to operate. For example, the device 10 shown in FIG. 1 is a digital watch which operates on electricity. Alternatively, however, the device 10 may comprise heart rate monitors, temperature monitors, GPS location detectors, transceivers, antennae, microprocessor, memory, memory bus and so on, which are commonly found in some Internet of Things devices.

As the skilled reader would understand, Internet of Things refer to daily objects that are embedded with health sensors, processing ability, software, and other technologies, and that connect and exchange data with other devices and systems over the Internet or other communications networks. These Internet of Things devices are often wearable devices that can benefit from being operated by a virtually endless supply of electricity harvested from movements of the user wearing these devices.

Typically, the electronic components are held inside a case 100 for protection. This case is called an inner case 100 herein, as the case is placed and encapsulated inside an outer case 110. The outer casing 110 is affixed to a belt for strapping onto the wrist of a wearer.

At least one piezoelectric element 140 is provided in a suitable part of the device 10 to generate electricity, for the operation of the electronic components in the inner case, from the movements of the wearer.

Piezoelectric Elements

Piezoelectricity is the electric charge that accumulates in certain solid materials such as crystals, or certain ceramics. The piezoelectric effect is caused by linear electromechanical interaction between the mechanical and electrical states in crystalline materials that has no inversion symmetry. Therefore, when piezoelectric elements are moved, stretched or impacted, the force is applied thereby onto the piezoelectric elements generates electrons that can flow to make an electrical current.

Piezoelectric elements 140 can be provided inside the outer case 110 to be impacted upon by the movable inner case to generate electricity. Additionally, piezoelectric elements 140 can be provided onto parts of the belt that are most likely to flex in order to generate electricity.

Inner Case and Outer Case

Typically, the inner case 100 contains functional units 220 such as a display screen for showing data or time, sensors such as temperature sensors and photoplethysmography sensors, Bluetooth transceivers, and/or other components which require electricity to operate.

The outer case 110 is preferably a thin-wall cuboid (illustrated) or cylinder (not illustrated), and the inner case 100 is slide-ably encapsulated in the outer case 110. Accordingly, the inner case 100 is smaller in size than the outer case 110 in order to fit into the outer case 110. Sufficient space 160 between the inner case 100 and the outer case 110 allows the inner case 100 to move relative to the outer case 110. Therefore, when the hand or wrist of the user wearing the device 10 moves, the inner case 100 is capable of being caused to slide inside the outer case 110, allowing mechanical impact between the inner case 100 and the outer case 110.

Typically, the outer case 110 is made of metal, steel, plastic, glass, or any other rigid material suitable for adornment of the wearer and for protecting the content inside the outer case 110. Optionally, the outer case 110 can have an open top, or a transparent covered top, on the side of the device 10 that faces away from the wrist of the wearer. The outer case 110 is connected to the outer band 120 via pinned, fixed connections, adhesives or any other securing mechanism.

Figure 3A:
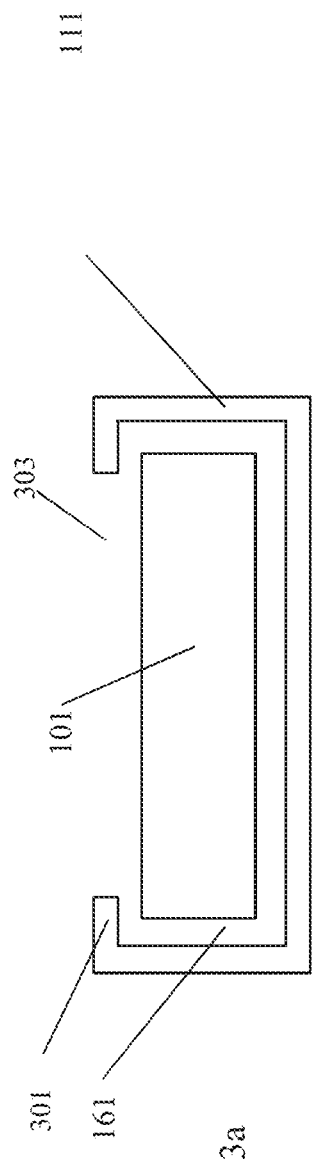
FIGS. 3a-3c show three layouts for the arrangement of the cases.
Figure 3B:
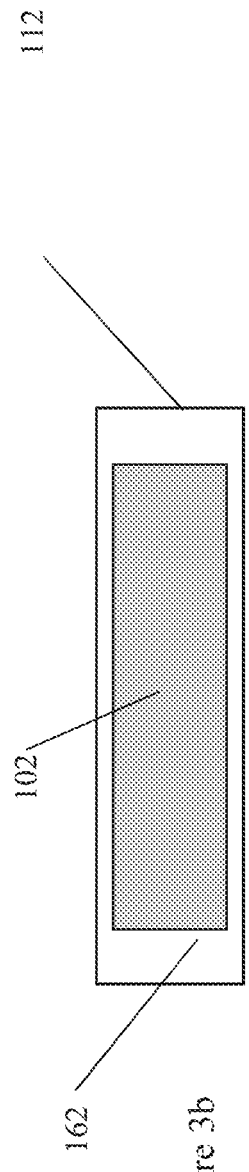
Figure 3C:
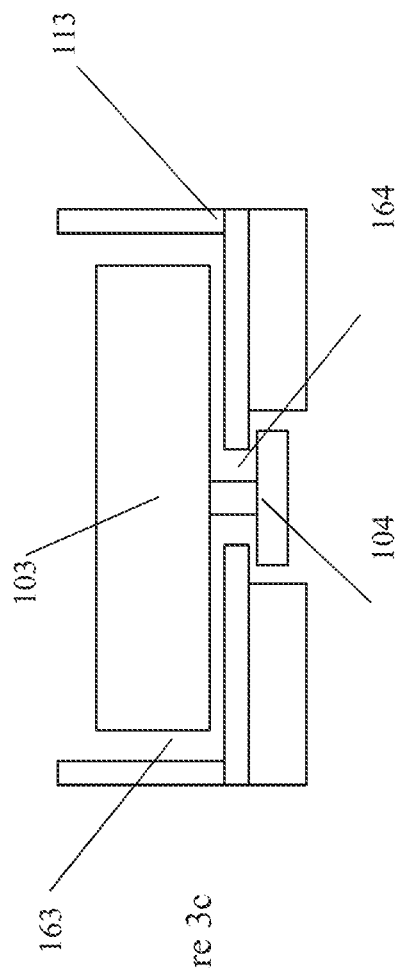

FIGS. 3a-3c show three different possible arrangements of the inner case 100 and the outer case 110, each of which is capable of allowing the inner case 100 to move within the outer case 110.

In the first arrangement, shown in the top drawing in FIG. 3a, the inner case 101 is a digital watch and has a surface that display time (not visible in cross sectional view). The outer case 111 is a thin wall structure and has a cuboid or cylinder shape. The space 161 is between the inner case 101 and the outer case 111 allows relative motion and mechanical impact between the inner case 101 and the outer case 111. An endless lip 301 (only cross-section shown) is supplied around the open top 303 to provide that the opening is smaller than the size of the inner case 101, in order to prevent the inner case 100 from falling out of the outer case 111. Alternatively, the opening on top 303 of the outer case 111 is sealed with transparent plastic or glass (not illustrated).

The drawing in FIG. 3b shows another arrangement of an inner case 102 and an outer case 112. In this example, the outer case 112 is the casing of a typical watch, so that consumers are not made aware of the technology disclosed herein that is hidden from view inside the outer case 112. One possibility of obtaining hardware parts supply is to re-cycle the shell of second-hand commercial smartwatches or smart wristbands to be used as the outer case 112, and to design the inner case 102 and internal components to be smaller than the outer case 122, so that there is space 162 between the inner case 102 and the outer case 112 allowing the inner case 103 to move within the outer case 112. Where the display on the outer case 112 is a digital time display, which draws data or information from the inner case 102, the user will not be aware that the inner case 102 inside the outer case 112 is movable. The methods of sending information from microprocessor components in the inner case 102 to a display on the outer case 112 is known by the skilled man, such as by a flexible bus between the inner case 102 and the outer case 112 that is long enough to accommodate movements of the inner case 102 inside the outer case 112, or by wireless communication between components in the inner case 102 and the display on the outer case 112, or any other method. There is no need for elaboration on these methods as the skilled man would be well aware of these methods. One major advantage of this arrangement is that the device 10 appears exactly as a commercial smart-watch or smart wristband. The difference is that the internal components in the device 10 are not secured to the outer shell.

The drawing in FIG. 3c shows another arrangement of the inner case 103 and the outer case 113. In this example, the outer case 113 does not have a top over the sidewalls of the inner case 103. The top of the outer case 113 is wide open. The inner case 103 is prevented from falling out of the outer case 113 by a stub 104 that extends from beneath the inner case 103 through a hole in the bottom of the outer case 113. The stub 104 has an enlarged head which prevents the inner case 103 from detaching from the outer case 113. The neck of the stub 104 is much narrower than the hole through which the stub 104 extends and has excess length so that the inner case 103 is not tightly riveted to the outer case 113, and provides room 163, 164 for movements of the inner case 103 and the stub 104 relative to the outer case 113. When the inner case 103 moves, the stub 104 and the bottom surface of the inner case 103 may impact against the internal surface of the outer case 113. Optionally, the top of the outer case 113 can be covered by a transparent cover (not illustrated). In one variation, the sidewalls of the outer case 113 is absent (not illustrated) so that the outer case 113 is no longer a container but a flat platform to which the inner case 103 is loosely and movably riveted by the stub 104.

Optionally, to avoid damage of the internal components in the watch body from hard impact, a protection layer such as velvet or polymer can be provided at the most prominent collision positions as cushions.

To scavenge the kinetic energy from mechanical impacts, piezoelectric elements 140, are attached onto either or both the surfaces of the outer case 110 or the inner case 100. The piezoelectric elements 140, convert the energy from the impact between the inner case 100 and the outer case 110 into electricity via the direct piezoelectric effect.

FIGS. 4a-4b illustrate two examples of how piezoelectric elements 140 can be provided on an outer case, such as the outer case 110 illustrated in FIG. 3a. The skilled reader would appreciate that these examples are applicable to other types of outer cases, including the outer case 112 in FIG. 3b and to the outer case 113 in FIG. 3c.

In the drawing of FIG. 4a, piezoelectric elements 140 are installed onto the internal surface of the outer case 111, on the internal sides and the inner base, so that the inner case 100 can directly impact onto the piezoelectric elements 140. The material of the piezoelectric elements 140 can be soft e.g., PVDF and/or stiff e.g., PZT piezoelectric materials. Typically, the piezoelectric elements 140 at the bottom of the outer case 111 and the piezoelectric elements 140 at the sidewalls of the outer case 110 all have a planar structure. Optionally, the piezoelectric elements 140 at the sidewalls are hollow cylinder, or are made up of several pieces of planar piezoelectric elements 140. The choice of shape for the piezoelectric elements 140 may depend on the shape of the outer case 111.

The drawing in FIG. 4b shows an alternative arrangement in which piezoelectric elements 140 are arranged on the external surfaces of the outer case 111. This arrangement prevents direct collisions between the piezoelectric elements 140 and the inner case 100. This shields the piezoelectric elements 140 from damage and allows the possibility of longer use-life. Preferably, the piezoelectric elements 140 are installed at the parts of the outer case 111 where the inner case 100 is more likely to impact against to improve the efficiency of transferring force to the piezoelectric elements 140.

Belt

Turning back to FIG. 1, the belt to which the outer case 110 is affixed has a two-band structure. That is, there is an inner band 130 for strapping tightly around the wrist of a wearer, and an outer band 120 that forms a loop around the first band. It is to the outer band 120 that the outer case 110 is actually affixed.

The outer band 120 is connected to the outer case 110 via pinned or fixed connections. One end of the outer band 120 is connected to a respective end of the inner band 130. A buckle (not shown) can be connected to this end. The other end of the second band is connected to a point along the first belt by adhesive, threads, rivets, buckles or any other methods.

As shown in the drawing, the first belt extends past this connection point so as to provide a tongue onto which holes may be provided. These holes can be held by the buckle in order to tighten the belt around the wrist.

The outer band 120 being made of a longer length of belt encircles the inner band 130 loosely. This allows the longer belt to be movable relative to the inner band 130. That is, the outer band 120 can wobble about the buckle when the wearer moves his hand. The difference in loop size between the inner band 130 and the outer band 120 provides a gap 150 between the inner band 130 and the outer band 120, which provides room for wobbling of the outer band 120.

A protection layer made of elastic membranes or fabric can be used to cover the gap 150 in the two-band structure. Covering up the gap 150 makes the device 10 to look like commercial smartwatches and smart bands without a noticeable gap 150. The two-band structure would simply look like a thick belt. For the sake of simplicity, the protection layer is not shown in FIG. 1.

Typically, the inner band 130 is just like the belt of a typical watch. That is, the inner band 130 is made of leather or flexible plastic such as polyvinylchloride. Preferably, however, both the inner band 130 and the outer band 120 are of plastic such as polyvinylchloride. In some embodiments, the outer band 120 is made of a rigid material such as steel.

Piezoelectric elements 140 are provided on the outer band 120. When the outer band 120 deforms the piezoelectric elements 140 is either stretched or compressed with the outer band 120, and converts the forces causing the deformation of the outer band 120 into electricity.

In an alternative embodiment, not shown, the piezoelectric elements 140 are placed on the inner band 130, and produces electricity when the outer band 120 wobbles and hits onto the piezoelectric elements 140, the force of the impact being convertible into electricity.

Movements of the Case and Belt

Motions of the hand of the user cause the inner case 100 to impact against the internal wall of the outer case 110, and the force is transferred to the outer band 120. As the inner case 100 may slide back and forth in the outer case 110, and as the outer band 120 is free to wobble, the impact transfers low-frequency motions of the user's hand into a series of repeated impacts inside the device 10, providing a "frequency up-conversion" of motions.

Preferably, the piezoelectric elements 140 are installed into the parts of the outer belt where there is greater likelihood of movements. That is, the piezoelectric elements 140 are placed on positions in the belt where the belt is likely to be flexed when the outer band 120 wobbles as the wearer apply his hand to daily tasks. For example, the sides of the outer band 120 as shown in FIG. 1 is more like to be flexed than the part of the outer band 120 where the outer case 110 is shown affixed. This is typically because bodily sidewise movements of the hand is more frequency than up down movements of the hand.

Typically, the outer band 120 has uniform cross-section and thickness throughout the length of the outer band 120. Alternatively, however, the outer band 120 has different thinner sections on the belt, not illustrated. These sections of the outer band 120 being thinner are weakened zones that tend to be flexed more readily that the thicker sections. Therefore, these thinner sections are preferred locations on the belt for securing piezoelectric elements 140. Yet more alternatively, the belt can have narrower sections (as opposed to cross-sectionally thinner sections), not illustrated, which provide sections that are more preferred locations on the belt for securing piezoelectric elements 140.

The piezoelectric elements 140 can be arranged as a bimorph or an unimorph. With the consideration of the reliability of the structure, the size of the piezoelectric elements 140 cannot be too large when they are made of stiff piezoelectric materials e.g., PZT also known as lead zirconate titanate.

Energy Flow

The electrical energy comes from the piezoelectric elements 140, or electromagnetic transducer 181, 190 or 182, 190 in the moveable 100 and fixed 110 inner case 100 and the outer case 110.

FIG. 6 shows the energy flow of the exemplary embodiment. As commercial electronic devices are usually driven by a DC power source, an AC-DC power management circuit is essential. When the wrist swings, it offers the base excitations to the device 10, leading to the vibration of the device 10. In the process, the mechanical energy from the wrist will convert into electrical energy by the piezoelectric elements 140 via direct piezoelectric effect or by the electromagnetic transducer 190 via electromagnetic induction. The electrical energy is rectified by an AC-DC rectifier 200 and the DC power is subsequently stored in an energy storage element 210 e.g., capacitors, supercapacitors and batteries, etc. The energy storage element 210 is finally used to power the functional elements 220 e.g., sensors, screen and Bluetooth, etc. of the commercially used smartwatches and smart wristbands.

Prototype

Figure 7:
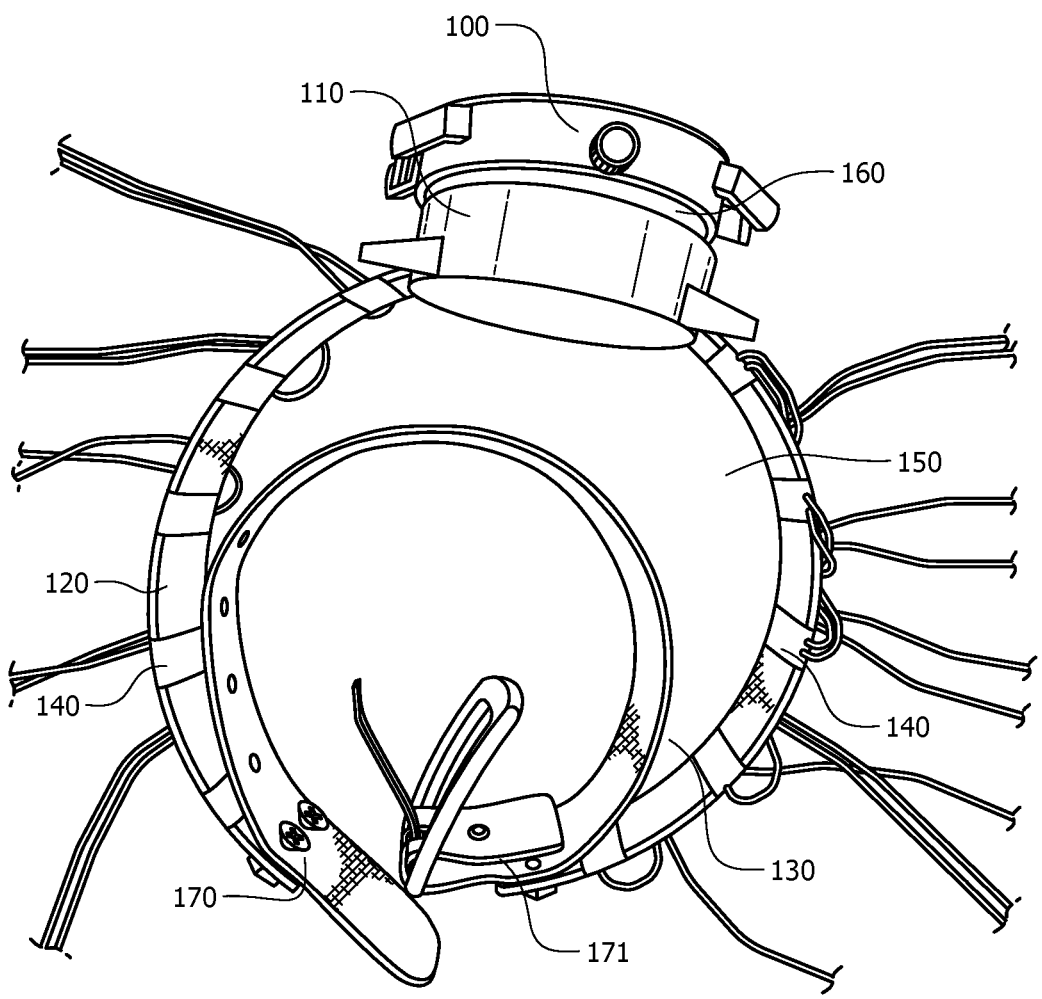
FIG. 7 is a prototype of the embodiment in FIG. 1.

FIG. 7 shows a prototype. The prototype is fabricated based on the design in FIG. 1. The inner case 100 and the outer case 110 are fabricated based on the bottom design in FIG. 3. The inner case 100 is a commercial watch weighted 36 grams. The outer case 110 is made of acrylonitrile-butadiene-styrene ABS and fabricated by 3D printing technology. They are connected by an inverted T-shaped structure (invisible in the photograph), which is also made of ABS and fabricated by a 3D printer. There is a space 160 between the T-shaped structure and the outer case 110. The outer band 120 is made of 65 manganese steel 65 MN and fabricated by the mold fabrication method. The shape of the outer band 120 is a circle with a radius of 40 mm, a thickness of 0.2 mm and a width of 20 mm. The inner band 130 is a commercial band and is connected to the outer band 120 via screws at the ends 170 and 171. There is a gap 150 between the outer band 120 and the inner band 130. Ten unimorphs are attached onto the internal surface of the outer band 120 using epoxy resin. Each piezoelectric element 140 has a length of 6 mm, a thickness of 0.2 mm and a width of 20 mm. The spacing between two adjacent patches is 14 mm.

Figure 8B:
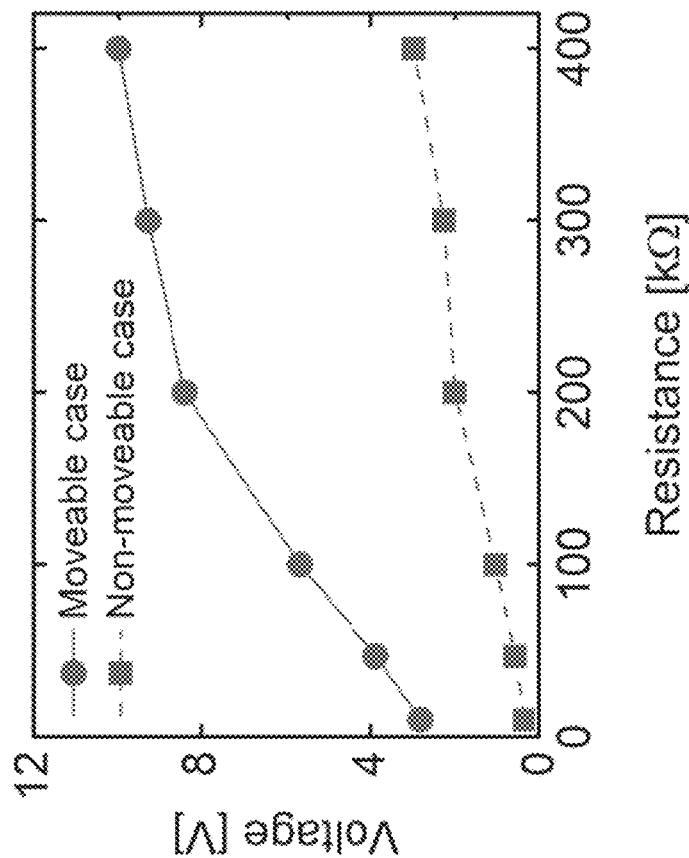
FIGS. 8a and 8b are the experimental results of the prototype in FIG. 7 from human hand-shaking motions.
Figure 8A:
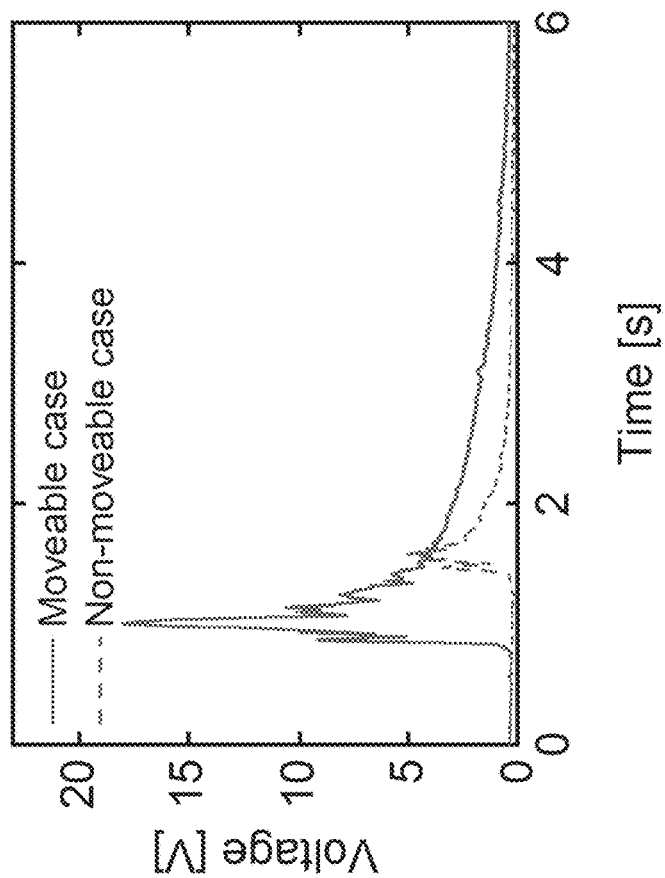

FIGS. 8a-8b are the experimental results of the prototype from human hand-shaking motion. In the experiment, a tester wears the prototype onto the wrist and shakes his hand. The oscilloscope records the voltage when resistance varies. As a comparison, the inner case 100 is fixed onto the outer case 110. FIG. 8a shows the waveforms of open-circuit voltage for both conditions. The maximum open-circuit voltage for the design with the inner case 100 is three times more than that with the non-inner case 100 due to the mechanical impact between the inner case 100 and the outer case 110. FIG. 8b shows the variation of the voltage with varying resistance. The voltage of the device 10 for both conditions shows an upward trend with larger resistance. The device 10 with the inner case 100 can generate a maximum voltage of 10 Volt at 400 kΩ, while the maximum voltage at 400 kΩ for its non-inner case 100 counterpart is around 3 Volt. Thus, this design has a better performance compared to its non-inner case 100 counterpart.

Belt Variations

Figure 2:
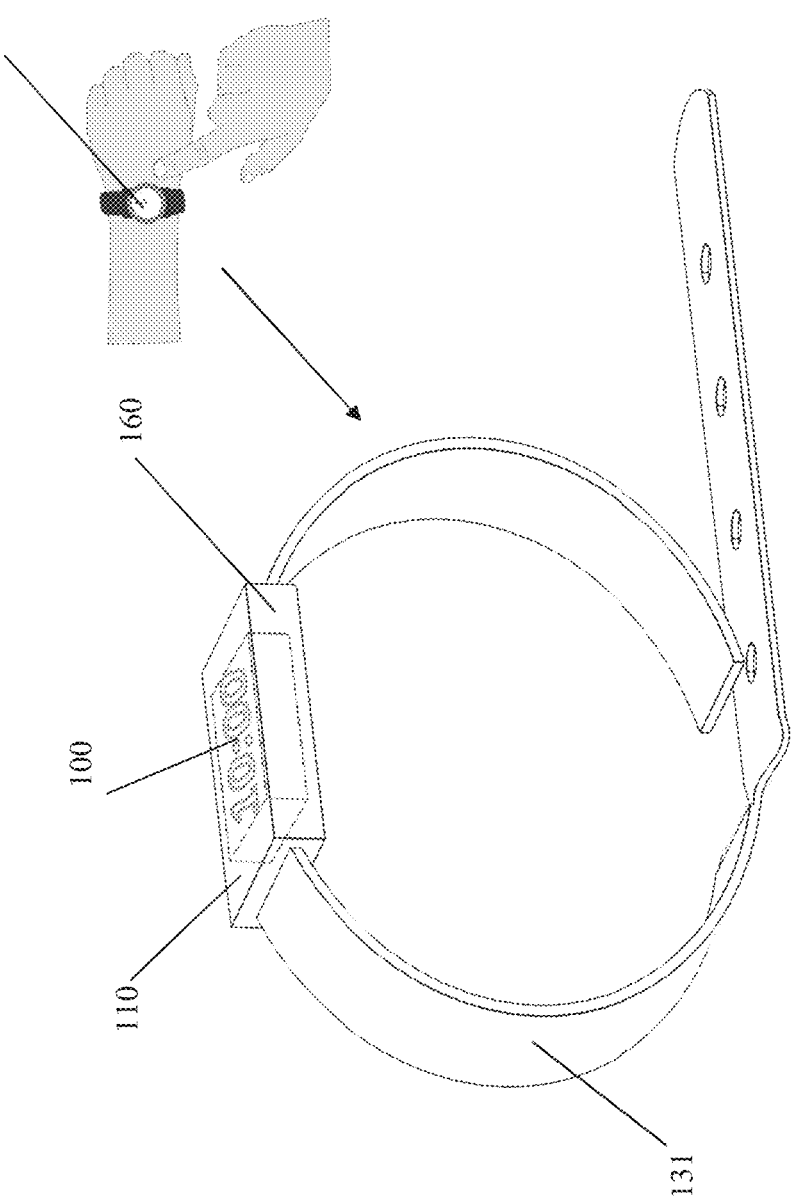
FIG. 2 is an isometric view of another embodiment with one wrist band and a moveable case.

To cause minimal changes to commercial smartwatches and smart wristbands, the energy harvester can also be a one-band structure. FIG. 2 is an isometric view of a device 20, which is a second exemplary embodiment. In this device 20, there is no inner band 130 and outer band 120; a single band 131 is provided for strapping the wrist of the wearer.

There is an outer case 110 which encapsulates an inner case 100 as discussed for the embodiment of FIG. 1. The band 131 is a commercially used watch or band strap. The connection conditions between the outer case 110 and the band 131 can be pinned or fixed. When the wearer moves his hand, the inner case 100 is caused to slide within the outer case 110. The internal walls of the outer case 110 are lined with piezoelectric elements 140. Therefore, impact of the inner case 100 against the outer case 110 can be used to create electricity in piezoelectric elements 140.

VARIATIONS OF EMBODIMENTS

Another design to absorb kinetic energy is a magnetic structure. FIGS. 5a-5b show alternative embodiments in which instead of piezoelectric elements 140 electromagnetic transducers are provided inside the outer case 110 to generate electricity from movements of the wearer.

In the drawing of FIG. 5a, the external surface of the inner case 101 is shown wrapped around with metal coils 190. Two magnets 181 are embedded into the bottom of the outer case 111. The magnets are orientated in the opposition polarity of each other, so as to create a magnetic flux. The inner case 100 is capable of moving in the outer case 110 when the wearer moves his hand. The movements of the coils through the magnetic flux create induction and generate electricity.

In the drawing of FIG. 5b, the external surface of the inner case 101 is shown wrapped around with metal coils 190. Two magnets 182 are embedded into the sides of the outer case 111 with reverse arrangement of polarity to create a magnetic flux.

In some embodiments, both the electromagnetic transducer 181, 190 or 182, 190 can be provided in the same device as piezoelectric elements 140 (i.e. piezoelectric energy harvesters) to harvest energy.

Figure 9:
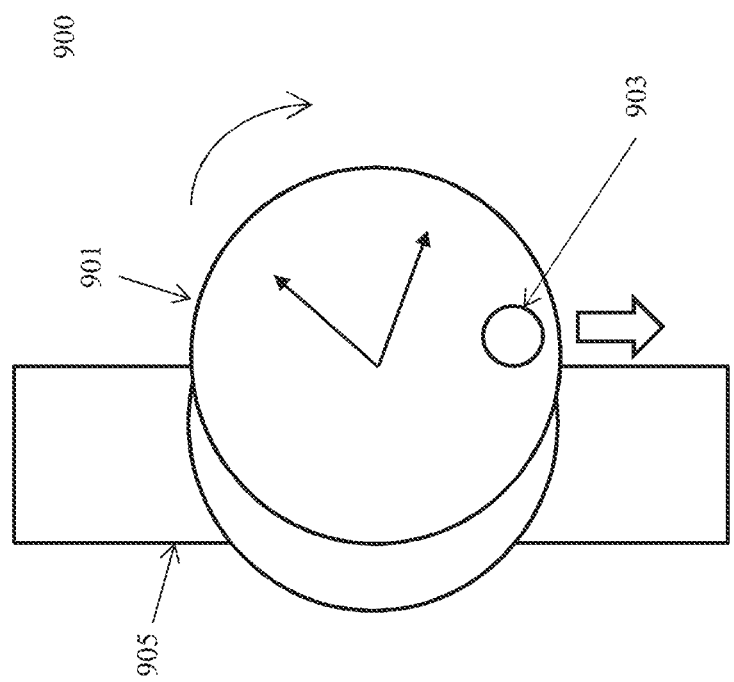
FIG. 9 shows yet another embodiment of the invention.

Other embodiments are within the contemplation of this application. For example, the movements need not be linear but rotation in the form of a torque around a point. FIG. 9 shows an embodiment which comprises a watch surface 901 that is freely rotational about an underlying disc secured to a belt (indicated by the curved arrow). The watch surface is supplied with a weight 903 that is biased (indicated by the white arrow) to the ground. When the belt 905 of the watch is tied to the wrist of the wearer, and the wearer moves his wrist randomly, the watch surface is rotated every now and then by the weight. This increases the random movements of the watch surface, which can be harvested by a piezoelectric element (not illustrated) or even a magnetic transducer (not illustrated) beneath the rotatable watch surface 901.

FIG. 10 shows yet a further embodiment 100, in which a display 1001 for presenting digital time information is connected to a base 1003 by a coil spring 1005. A narrow iron or conductive core (not illustrated) can be inserted through the core of the coil spring 1005. The base can hide two or more magnets (not illustrated) arranged to provide a magnetic flux to the coil. Movements of the hand wearing this embodiment 1000 will cause the platform to move and wobble relative to the base, leading to the coil spring 1005 cutting through magnetic flux to create electricity.

Although a device to be worn on the wrist has been described, other parts of the body that may wear a device are within the contemplation of this application, including the ankle, the neck, torso and so on. In particular, the wrist and ankle have the most random and varied motions and are best suited for harvesting energy from the wearer.

Yet other devices which are not watch or monitoring devices are within the contemplation of this application. For example, the movements of the wrist or ankles can be used to just power an active RFID radio frequency identity chip for monitoring of the whereabouts of toddlers or prisoners. Hence, it is not necessary that all embodiments have a watch or an analytical device.

Accordingly, the embodiments describe wearable devices that comprise parts that may be worn on the body of a person securely. The embodiments further contain disjointed parts that are relatively movable against the secured parts. These movable parts remove the dampening from the typical controlled movements of the person, allowing random movements to continue in these movable parts. This increases the frequency of movements experienced by these moving parts, and that the energy that causes these movements can be harvested and converted into electrical energy that can power the devices.

Therefore, the present disclosure describes devices that are capable of converting movement caused, kinetic energy into electrical energy, i.e. devices which are impact-energy-harvesters. These devices are capable of converting kinetic energy from human body motions into electrical energy using piezoelectric elements 140 via the direct piezoelectric effect and/or using electromagnetic transducer via electromagnetic induction.

The present disclosure takes the advantage of the few changes to the configuration of commercial smartwatches and smart bands. It does not increase the weight and volume to the wearables. Embodiments of the invention will be easily adopted by the wearable market due to the minimal changes. In the simplest form of the devices, a device is mainly composed of the following components: one inner case 100, one outer case 110, one outer band 120, one inner band 130, several piezoelectric elements 140, and/or one electromagnetic transducer 181, 190 or 182, 190.

While there has been described in the foregoing description preferred embodiments of the present invention, it will be understood by those skilled in the technology concerned that many variations or modifications in details of design, construction or operation may be made without departing from the scope of the present invention as claimed.

The invention claimed is:

1. A device capable of being carried on a part of a body of a person, the device comprising:
    a first belt configured to encircle a body part of the person;
    a second belt integral to the first belt, the second belt also configured to encircle the same body part and having a larger diameter than a diameter of the first belt;
    the second belt being resiliently movable relatively to the first belt;
    a housing secured to the second belt; the housing comprising
        at least one motion-based electricity generator to generate electricity from movements of the second belt, the motion-based electricity generator being movable inside the housing.

2. The device capable of being carried on a part of the body of a person as claimed in claim 1, wherein
    the at least one motion based electricity generator is an electromagnetic transducer;
    the electromagnetic transducer having a magnet and an inductive coil capable of being moved relative on to the other by the movements of the motion-based electricity generator inside the housing.

3. The device capable of being carried on a part of the body of a person as claimed in claim 1, wherein the at least one motion based electricity generator is a piezoelectric element.

4. The device capable of being carried on a part of the body of a person as claimed in claim 1, wherein the body part is a wrist of the person.

5. The device capable of being carried on a part of the body of a person as claimed in claim 4, wherein the
housing contains a time telling device;
   the time telling device being movable inside the housing, and
      a piezoelectric element being affixed to the housing.

\* \* \* \* \*